United States Patent
Nakamura et al.

(10) Patent No.: US 6,541,559 B2
(45) Date of Patent: Apr. 1, 2003

(54) POLYAMIDE RESIN COMPOSITION SHOWING EXCELLENT WELD STRENGTH

(75) Inventors: Ken Nakamura, Yamaguchi (JP); Akio Miyamoto, Yamaguchi (JP)

(73) Assignee: UBE Industries, Ltd., Ube ( * ) Notice: Subject to any disclaimer, the term of this patent is extended or adjusted under 35 U.S.C. 154(b) by 0 days.

(21) Appl. No.: 09/854,030

(22) Filed: May 11, 2001

(65) Prior Publication Data

US 2002/0028889 A1 Mar. 7, 2002

(30) Foreign Application Priority Data

May 24, 2000 (JP) ........................ 2000-152931
May 24, 2000 (JP) ........................ 2000-152932

(51) Int. Cl.$^7$ .............................................. C08L 77/00
(52) U.S. Cl. ..................................... 524/538; 525/432
(58) Field of Search ........................... 525/432; 524/538

(56) References Cited

U.S. PATENT DOCUMENTS 4,404,317 A   9/1983   Epstein et al.

FOREIGN PATENT DOCUMENTS

| EP | 0 400 428 A1 | 12/1990 |
| EP | 0 934 979 A2 | 8/1999 |
| EP | 1 018 534 A2 | 7/2000 |
| JP | 58-53949 A | 3/1983 |
| JP | 58-53950 A | 3/1983 |
| JP | 06263895 | 9/1994 |
| JP | 0 728 812 A1 | 8/1996 |
| JP | 8-337718 A | 12/1996 |
| JP | 9-176484 A | 7/1997 |
| JP | 09 241505 A | 9/1997 |
| JP | 10-219106 A | 8/1998 |
| WO | WO 95/26868 | 10/1995 |

*Primary Examiner*—Ana Woodward
(74) *Attorney, Agent, or Firm*—Akin, Gump, Strauss, Hauer & Feld, L.L.P.

(57) ABSTRACT

A polyamide resin composition is provided, which has an excellent flowability upon molding and shows a high strength when subjected to various welding methods. The resin composition for use in molding comprises (A) 96 to 99.9% by weight of a crystalline polyamide resin and (B) 0.1 to 4% by weight of a non-crystalline, partially aromatic copolymerized polyamide resin containing at least two kinds of aromatic monomer components, with the total content of (A) and (B) being 100% by weight, or comprises (A), (B) and (C) 5 to 200 parts by weight of an inorganic filler per 100 parts by weight of sum of (A) and (B). The polyamide resin compositions show an excellent weld strength.

5 Claims, 2 Drawing Sheets

POLYAMIDE RESIN COMPOSITION SHOWING EXCELLENT WELD STRENGTH

FIELD OF THE INVENTION

The present invention relates to polyamide resin compositions having excellent mechanical properties and moldability and showing excellent weld strength. The resin compositions are used as materials for automobiles or electrical or electronic parts.

BACKGROUND OF THE INVENTION

Crystalline polyamide resins have widely been used as industrial materials owing to their high strength and rigidity. However, reinforced polyamides using only crystalline polyamides as polyamide show insufficient weld strength due to their crystallinity when subjected to welding which has become often used in recent years in production of resinous parts. Thus, they can not be used for parts requiring a high weld strength. In cases when polyamides composed of non-crystalline polyamides alone are used, there can be obtained enough vibration weld strength, but moldability, in particular flowability, is so poor that injection weld strength is low, which has limited the use of them.

With the recent increase in number of parts formed by using welding technique, various investigations have been made as to techniques for improving weld strength of crystalline polyamides. JP-A-9-176484 (The term "JP-A" as used herein means an "unexamined published Japanese patent application") and JP-A-10-219106 propose a technique of using copper iodide and potassium iodide to improve welding properties of nylon. However, this technique involves the problem that, since the amounts of actually used potassium iodide and copper iodide are so large, there result decreased mechanical strength and generation of a decomposition gas upon molding. JP-A-8-337718 proposes a technique of using a crystalline copolymer nylon. In cases of using the copolymer nylon, welding properties are markedly improved, but there result decreased mechanical strength and decreased rigidity and decreased durability including heat resistance, which limits the use of the copolymer nylon.

Compositions analogous to the composition of the present invention have long been known, and are disclosed in JP-A-58-53949 and JP-A-58-53950. These inventions, however, are techniques for improving metal halide resistance, hot water resistance or warping resistance of aliphatic nylons, and hence a larger amount of non-crystalline nylon is required to be added in comparison with the present invention. It has not been known at all to obtain the effect of improving welding properties within the composition range of the present invention.

SUMMARY OF THE INVENTION

The present invention provides a polyamide resin composition which shows excellent flowability upon molding, high cycling properties, and high weld strength when subjected to various welding methods, thus solving the above-described problems.

As a result of intensive investigations to solve the problems, the inventors of the present invention have found that the problems can be solved by adding a non-crystalline, partially aromatic copolymerized polyamide resin containing at least two aromatic monomer components in an extremely small amount to a crystalline polyamide resin, thus having completed the present invention based on the finding.

That is, the present invention relates to a polyamide resin molding composition, which shows excellent weld strength and which comprises:

(A) 96 to 99.9% by weight of a crystalline polyamide resin and;
(B) 0.1 to 4% by weight of a non-crystalline, partially aromatic, copolymerized polyamide resin containing at least two aromatic monomer components, with the total content of the crystalline polyamide and the non-crystalline, partially aromatic, copolymerized polyamide resin being 100% by weight.

Further, the present invention relates to a polyamide resin molding composition, which further comprises (C) 5 to 200 parts by weight of an inorganic filler per 100 parts by weight of the above-described polyamide resin molding composition.

DETAILED DESCRIPTION OF THE INVENTION

The present invention is described in more detail below.

The crystalline polyamide resin (A) to be used in the present invention is an aliphatic polyamide resin prepared from an aliphatic diamine and an aliphatic dicarboxylic acid or from a lactam or an aminocarboxylic acid, or a partially aromatic, copolymerized polyamide resin containing one aromatic monomer component.

The monomer components of the aliphatic polyamide resin are an aliphatic diamine containing 4 to 12 carbon atoms and an aliphatic dicarboxylic acid containing 6 to 12 carbon atoms, or a lactam containing 6 to 12 carbon atoms or an aminocarboxylic acid containing 6 to 12 carbon atoms. Specific examples of the aliphatic diamine include tetramethylenediamine, hexamethylenediamine, octamethylenediamine, nonamethylenediamine, undecamethylenediamine and dodecamethylenediamine, and specific examples of the aliphatic dicarboxylic acid include adipic acid, heptanedicarboxylic acid, octanedicarboxylic acid, nonanedicarboxylic acid, undecanedicarboxylic acid and dodecanedicarboxylic acid. A preferred combination of the aliphatic diamine and the aliphatic dicarboxylic acid is a equimolar salt between hexamethylenediamine and adipic acid.

Specific examples of the lactam include α-pyrrolidone, ε-caprolactam, ω-laurolactam and ε-enantolactam, and specific examples of aminocarboxylic acid include 6-aminocaproic acid, 7-aminoheptanoic acid, 11-aminoundecanoic acid and 12-aminododecanoic acid, with 6-aminocaproic acid, 12-aminododecanoic acid, ε-caprolactam and laurolactam being preferred.

The aliphatic polyamide-forming monomers may be used alone or in combination of two or more of them.

Specific examples of the aliphatic polyamide resin formed from these monomer components include nylon-6, nylon-11, nylon-12, nylon-6,6, nylon-6,10, nylon-6,12 and nylon-11,6. These may be homopolymers or copolymers of two or more monomers.

The crystalline, partially aromatic, copolymerized polyamide resin containing one aromatic monomer component means a copolymerized polyamide containing one aromatic monomer component such as an aromatic dicarboxylic acid component (e.g., terephthalic acid, isophthalic acid or naphthalenedicarboxylic acid). Preferably, it is a crystalline, partially aromatic, copolymerized polyamide resin containing one aromatic monomer component and having a melting point of from 260° C. to less than 320° C., more preferably, a crystalline, partially aromatic, copolymerized polyamide resin containing one aromatic monomer component and having a melting point of from 290° C. to less than 316° C.

The crystalline, partially aromatic, copolymerized polyamide resin containing one aromatic monomer component is preferably a crystalline copolymerized polyamide prepared from an equimolar salt between the aliphatic diamine and the aliphatic dicarboxylic acid, an equimolar salt between the aliphatic diamine and the aromatic dicarboxylic acid and/or an aliphatic, polyamide-forming monomer.

The aliphatic diamine is an aliphatic diamine containing 4 to 12 carbon atoms, and is exemplified by tetramethylenediamine, hexamethylenediamine, octamethylenediamine, nonamethylenediamine, undecamethylenediamine and dodecamethylenediamine.

The aliphatic dicarboxylic acid is an aliphatic dicarboxylic acid containing 6 to 12 carbon atoms, and is exemplified by adipic acid, heptanedicarboxylic acid, octanedicarboxylic acid, nonanedicarboxylic acid, undecanedicarboxylic acid and dodecanedicarboxylic acid.

A preferred combination is an equimolar salt between hexamethylenediamine and adipic acid.

As the aromatic dicarboxylic acid, there are illustrated terephthalic acid, isophthalic acid and naphthalenedicarboxylic acid. A preferred combination is an equimolar salt between hexamethylenediamine and terephthalic acid.

The aliphatic, polyamide-forming monomers are aminocarboxylic acids containing 6 to 12 carbon atoms and lactams containing 6 to 12 carbon atoms, and are exemplified by 6-aminocaproic acid, 7-aminoheptanoic acid, 11-aminoundecanoic acid, 12-aminododecanoic acid, α-pyrrolidone, ε-caprolactam, laurolactam and ε-enantolactam, with 6-aminocaproic acid, 12-aminododecanoic acid, ε-caprolactam and laurolactam being preferred. The aliphatic, polyamide-forming monomers may be used independently or as a mixture of two or more of them.

As to the amounts of these components to be used, 30 to 70% by weight of equimolar salt between hexamethylenediamine and adipic acid, 70 to 30% by weight of equimolar salt between hexamethylenediamine and terephthalic acid, and 0 to 15% by weight of the aliphatic, polyamide-forming monomer are used, with 35 to 55% by weight of equimolar salt between hexamethylenediamine and adipic acid, 65 to 45% by weight of equimolar salt between hexamethylenediamine and terephthalic acid, and 0 to 10% by weight of the aliphatic, polyamide-forming monomer being preferred, with the total content of the equimolar salt between hexamethylenediamine and adipic acid, the equimolar salt between hexamethylenediamine and terephthalic acid and the aliphatic polyamide-forming monomer being 100% by weight.

The crystalline polyamide resin of the present invention is not particularly limited as to polymerization degree. However, polyamide resins having a relative viscosity of 1.8 to 5.0 measured at 25° C. by dissolving 1 g of the polymers in 100 ml of 96% conc. sulfuric acid are preferred, with those having a relative viscosity of 2.0 to 3.0 being more preferred. Polyamide resins with a higher relative viscosity than the above-described upper limit show a seriously deteriorated workability, whereas those with a lower relative viscosity than the above-described lower limit show a decreased mechanical strength, thus not being preferred.

The component (B) of non-crystalline, partially aromatic copolymerized polyamide resin containing at least 2 aromatic monomer components to be used in the present invention is a polyamide resin containing at least one of terephthalic acid component and heteroaromatic compounds in addition to isophthalic acid. This non-crystalline, partially aromatic copolymerized polyamide resin is preferably a non-crystalline polyamide having a glass transition point of 100° C. or higher determined from the peak temperature of loss modulus upon absolute drying obtained by measurement of dynamic visco-elasticity, with those containing two or more equimolar salts between an aliphatic diamine and an aromatic dicarboxylic acid being desirable.

The aliphatic diamine is an aliphatic diamine containing 4 to 12 carbon atoms, and is exemplified by tetramethylenediamine, hexamethylenediamine, octamethylenediamine, nonamethylenediamine, undecamethylenediamine and dodecamethylenediamine.

The aromatic dicarboxylic acid is exemplified by terephthalic acid, isophthalic acid and naphthalenedicarboxylic acid, and a preferred combination is an equimolar salt between hexamethylenediamine and terephthalic acid and an equimolar salt between hexamethylenediamine and isophthalic acid.

As the non-crystalline, partially aromatic copolymerized polyamide resin containing at least two kinds of aromatic monomer components to be used as component (B) in the present invention, those which comprise 100 to 60% by weight of the polyamide-forming components of the aliphatic diamine, isophthalic acid and terephthalic acid and 0 to 40% by weight of the aliphatic polyamide component are preferred, with the total content of the polyamide-forming component and the aliphatic polyamide component being 100% by weight.

As the equimolar salt between the aliphatic diamine and the aromatic dicarboxylic acid, those which comprise the aromatic dicarboxylic acid 60 to 95 mol % of which is terephthalic acid component unit, and 5 to 40 mol % of which is isophthalic acid component unit, and the aliphatic diamine are preferred, with the total content of the terephthalic acid component unit and the isophthalic acid component being 100 mol %.

In the present invention, mixing ratio of the crystalline polyamide resin (A) to the non-crystalline, partially aromatic, copolymerized polyamide resin (B) containing at least 2 aromatic monomer component units is such that content of resin (A) is in the range of from 96 to 99.9% by weight, and content of resin (B) in the range of from 0.1 to 4% by weight, with the total content of the resin (A) and the resin (B) being 100% by weight. Preferably, the content of resin (A) is 97 to 99% by weight, and the content of resin (B) in the renge of from 1 to 3% by weight, with the total content of the resin (A) and the resin (B) being 100% by weight.

In cases when the content of the resin (B) of non-crystalline, partially aromatic, copolymerized polyamide resin exceeds the above-described upper limit, there result a poor flowability within a metal mold and delayed crystallization, which spoils high-cycle moldability, thus such contents not being preferred.

On the other hand, in cases when the content of the resin (B) of non-crystalline, partially aromatic, copolymerized polyamide resin is less than the above-described lower limit, there results an insufficient effect of improving weld strength, thus the objects of the present invention not being attained.

The resin composition of the present invention may be used, as such, as a material for automobiles or for parts of electrical or electronic articles, but fillers or function-imparting agents such as a heat-resisting agent, a weathering agent, a nucleating agent, a crystallization accelerator, a parting agent, a lubricant, an antistatic agent, a flame retardant, a flame retardant aid and a colorant may further be added thereto within an amount not spoiling the objects of the present invention.

More specifically, as the filler, there are illustrated fibrous inorganic materials such as glass fibers, carbon fibers, wollastnite and potassium titanate whisker; inorganic fillers such as montmorylonite, talk, mica, calcium carbonate, silica, clay, glass powder and glass beads; and organic fillers such as various organic or high molecular powders.

As inorganic fillers to be used as component (C) in the present invention, there are illustrated fibrous inorganic materials such as glass fibers, carbon fibers, wollastnite and potassium titanate whisker; inorganic fillers such as montmorylonite, talk, mica, calcium carbonate, silica, clay, kaolin, glass powder and glass beads; and organic fillers such as various organic or high molecular powders. Of these, glass fibers or talc are preferably used, with glass fibers being more preferred.

The fibrous fillers have a fiber diameter of 0.01 to 20 $\mu$m, preferably 0.03 to 15 $\mu$m, and have a fiber cut length of 0.5 to 10 mm, preferably 0.7 to 5 mm.

The inorganic filler (C) to be used in the present invention is used in an amount of 5 to 200 parts by weight, preferably 10 to 150 parts by weight, more preferably 10 to 100 parts by weight, per 100 parts by weight of the resultant polyamide resin molding composition. If the amount is less than 5 parts by weight, there results a polyamide resin molding composition having an insufficient mechanical strength. If more than 200 parts by weight, there results a polyamide resin molding composition having a deteriorated moldability and a deteriorated surface state, though having a sufficient mechanical strength, thus not being preferred.

The resin composition of the present invention may be used, as such, as a material for automobiles or for parts of electrical or electronic articles, but fillers or function-imparting agents such as a heat-resisting agent, a weathering agent, a nucleating agent, a crystallization accelerator, a parting agent, a lubricant, an antistatic agent, a flame retardant, a flame retardant aid and a colorant may further be added thereto within an amount not spoiling the objects of the present invention.

More specifically, as the heat-resisting agents, there are illustrated hindered phenols, phosphites, thioethers and copper halides. These may be used independently or as a combination thereof.

As the weathering agents, there are illustrated hindered amines and salicylates, which may be used independently or as a combination thereof.

As the nucleating agents, there are illustrated inorganic fillers such as talc and clay and organic nucleating agents such as metal salts of fatty acids, which may be used independently or as a combination thereof.

As the crystallization accelerators, there are illustrated low molecular weight poltyamides, higher fatty acids, higher fatty acid esters and higher aliphatic alcohols, which may be used independently or as a combination thereof.

As the parting agents, there are illustrated metal salts of fatty acids, fatty acid amides and various waxes, which may be used independently or as a combination thereof.

As the antistatic agents, there are illustrated aliphatic alcohols, aliphatic alcohol esters and higher fatty acid esters, which may be used independently or as a combination thereof.

As the flame retardants, there are illustrated metal hydroxides such as magnesium hydroxide, phosphorus, ammonium phosphate, ammonium polyphosphate, melamine cyanurate, ethylenedimelamine dicyanurate, potassium nitrate, brominated epoxy compounds, brominated polycarbonate compounds, brominated polystyrene compounds, tetrabromobenzyl polyacrylate, tribromophenol polycondensates, polybromobiphenyl ethers, and chlorine-containing flame retardants, which may be used independently or as a combination thereof.

To the resin composition of the present invention may be added other thermoplastic resin compositions in an amount not spoiling the objects of the present invention. Thermoplastic resins to be used together are exemplified by general-purpose resin materials such as polyethylene, polypropylene, polystyrene, ABS resin, AS resin and acrylic resin; aliphatic polyamide resins such as nylon-6, nylon-6,6 and nylon-12; polycarbonate; polyphenylene oxide; polyethylene terephthalate; polybutylene terephthalate; polyphenylene sulfide; and highly heat-resistant resins. In particular, in using polyethylene or polypropylene in combination, polyethylene or polypropylene modified with maleic anhydride or a glycidyl group-containing monomer is desirably used.

The resin composition of the present invention may be formed by blending respective resin pellets, and melt-mixing it in the stage of obtaining a final product or, alternatively, by previously melt-mixing in a uniaxial or biaxial extruder or a Banbury mixer, then subjected to molding. Thus, the resin composition may be subjected to extrusion molding, blow molding or injection molding.

The composition of the present invention can remarkably exhibits its performance when used for products to be subjected to welding method, but its use is not limited only to this.

As specific examples of the welding method, there are illustrated injection welding method such as vibration welding method, die slide injection (DSI) method and die rotary injection (DRI) method; ultrasonic welding method, spin welding method, hot plate welding method, heat ray welding method, laser welding method and high-frequency induction heating welding method.

Further, the composition of the present invention exhibits its performance when used in multi-color molding or in products having melt-joint portions such as weld portions.

The composition of the present invention can be used for engines, transmission, differential mechanism parts, chassis parts, external parts or internal parts of automobiles or two-wheeled vehicles, electrical device parts, and electrical or electronic parts.

Specific examples include machinery such as an oil strainer, a timing chain cover, a rocker cover, an intake manifold, a fuel rail, a timing chain tensioner, a thrust washer, a power steering tank, a brake fluid sub-tank, a canister, an automatic transmission stater, an air cleaner, a resonator, a vacuum tank, a throttle body, a radiator tank, a thermostat housing, a radiator inlet pipe, a radiator outlet pipe, a gear, a retainer, a front end, a head light stay, a lower arm and a link; hollow parts such as an air duct, a gasoline tank, a brake pipe and a fuel pipe; pedals such as an accelerator pedal, a brake pedal and a clutch pedal; electrical device parts such as a sensor, a relay box and a connector;

and electrical or electronic parts such as a terminal board, a connecter and a relay.

The invention is described in more detail by reference to Examples and Comparative Examples which, however, do not limit the invention.

Additionally, physical properties of moldings obtrained in Examples and Comparative Examples were measured in the following manner.
(Evaluation of Physical Properties)
(Evaluation of Mechanical Properties)

Figure 1:
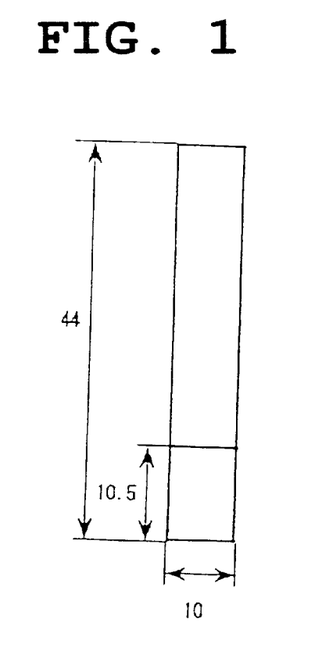
FIG. 1 is a front view of one embodiment of a test specimen. (unit of numerical values: mm)
Figure 2:
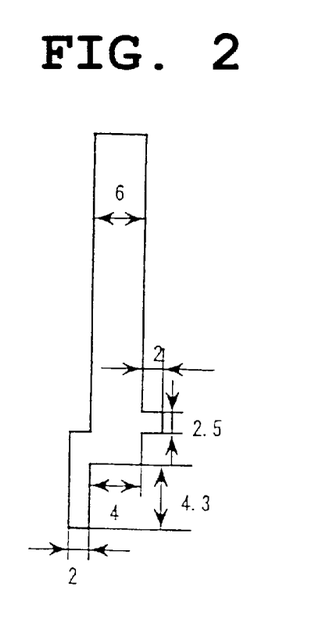
FIG. 2 is a side view of one embodiment of a test specimen. (unit of numerical values: mm)
Figure 3:
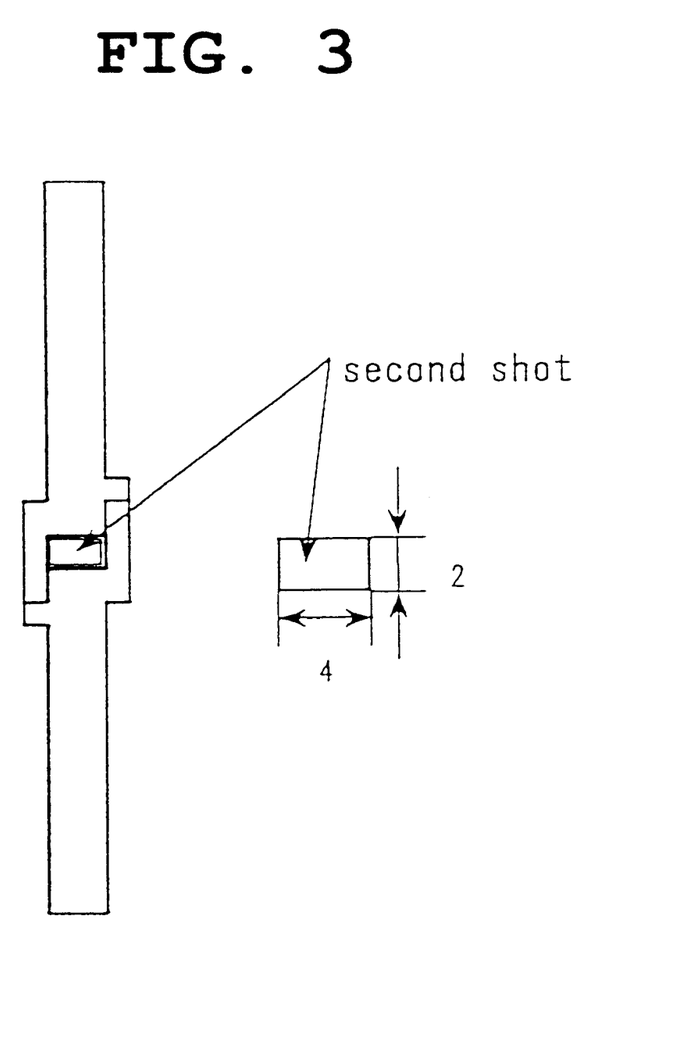
FIG. 3 shows the state of a test specimen molded according to die rotary injection (DRI) method.

Evaluation was conducted with respect to the following items. Every evaluation was conducted in a dry state.
(1) Tensile Strength and Elongation Measurement was conducted according to ASTMD638 at a pulling rate of 5 mm per minute using a 3.2-mm thick No. 1 tensile specimen.
(2) Bending Strength and Bending Modulus Three-point bending test was conducted according to ASTMD790 using a 3.2-mm thick, strip-shaped test specimen.
(3) Impact Strength Impact strength was evaluated by means of an Izod impact tester according to ASTMD256 using a 3.2-mm thick, strip-shaped test specimen notched by post-work.
(Evaluation of Moldability)
(4) Flow Length Flow length was measured under an injection pressure of 50 MPa using a spiral mold for use in measuring flow length of a 12.5-mm wide, 1-mm thick stick and using an injection molding machine, SG75, made by Sumitomo Juki K.K.
(Evaluation of Weld Strength)
(5) Injection Weld Strength Tensile strength of a test specimen of the shape shown in FIGS. 1 to 3 was measured, the specimen having been prepared from the composition of the present invention and molded according to DRI method under the conditions described below. Pulling was conducted at a pulling rate of 5 mm/sec and a chuck-to-chuck distance of 25 mm.

Molding machine: Nikko N140BII
Resin temperature: shown in Tables 1 and 2
Mold temperature: 80° C.
Dwell pressure application: 20 MPa
Injection time: 1 sec
Cooling time: 20 sec

EXAMPLE 1

97% by weight of polyamide 6 (1015B made by Ube Industries, Ltd.; relative viscosity: 2.65) and 3% by weight of polyamide 6I/6T (GRIVORY G21 made by EMS Co.) were uniformly mixed in advance, with the total content of polyamide 6 and polyamide 6I/6T being 100% by weight, and kneaded in a biaxial, 44-mm φ vented extruder set at a barrel temperature of 270° C. to prepare intended pellets of polyamide resin composition. Then, after drying the obtained pellets for 24 hours under a reduced pressure of 10 torr at 110° C., the pellets were subjected to injection molding at a cylinder temperature of 270° C. and a mold temperature of 80° C., followed by evaluating moldability and flowability according to ASTM using the tensile specimen, the bending test specimen and the impact test specimen. Further, tensile strength of a specimen molded by DRI method was measured. Results thus obtained are shown in Table 1.

EXAMPLES 2 TO 5

Polyamide resin compositions were prepared in the same manner as in Example 1 except for changing the charging ratio of polyamide 6 to polyamide 6I/6T as shown in Table 1, and subjected to evaluation of their physical properties. Results thus obtained are also shown in Table 1.

COMPARATIVE EXAMPLE 1

A polyamide resin was prepared in the same manner as in Example 1 except for not using the non-crystalline, partially aromatic, copolymerized polyamide resin (B), and subjected to evaluation of their physical properties. Results thus obtained are also shown in Table 1.

COMPARATIVE EXAMPLES 2 AND 3

Polyamide resin compositions were prepared in the same manner as in Example 1 except for changing the charging ratio of polyamide 6 to polyamide 6I/6T as shown in Table 1, and subjected to evaluation of their physical properties. Results thus obtained are also shown in Table 1.

EXAMPLE 6

A polyamide resin composition was prepared in the same manner as in Example 1 except for using polyamide 66 (2020B made by Ube Industries, Ltd.; relative viscosity: 2.70) in place of polyamide 6 as the polyamide resin, and subjected to evaluation of their physical properties. Kneading was conducted at a barrel temperature of 285° C., and injection molding was conducted at a cylinder temperature of 275° C. and a mold temperature of 80° C. Results thus obtained are shown in Table 2.

EXAMPLE 7

A polyamide resin composition was prepared in the same manner as in Example 1 except for using polyamide 66/6T (8123X made by Ube Industries, Ltd.; relative viscosity: 2.30) in place of polyamide 6 as the polyamide resin, and subjected to evaluation of their physical properties. Kneading was conducted at a barrel temperature of 320° C., and injection molding was conducted at a cylinder temperature of 320° C. and a mold temperature of 110° C. Results thus obtained are also shown in Table 2.

EXAMPLE 8

A polyamide resin composition was prepared in the same manner as in Example 1 except for using polyamide 6/66 (2123B made by Ube Industries, Ltd.; relative viscosity: 2.65) in place of polyamide 6 as the polyamide resin, and subjected to evaluation of their physical properties. Kneading was conducted at a barrel temperature of 280° C., and injection molding was conducted at a cylinder temperature of 270° C. and a mold temperature of 80° C. Results thus obtained are also shown in Table 2.

EXAMPLE 9

A polyamide resin composition was prepared in the same manner as in Example 1 except for using polyamide 12 (3020B made by Ube Industries, Ltd.; relative viscosity: 2.90) in place of polyamide 6 as the polyamide resin, and subjected to evaluation of their physical properties. Kneading was conducted at a barrel temperature of 240° C., and injection molding was conducted at a cylinder temperature of 240° C. and a mold temperature of 80° C. Results thus obtained are also shown in Table 2.

COMPARATIVE EXAMPLE 4

A polyamide resin was prepared in the same manner as in Example 6 except for not using the non-crystalline, partially aromatic, copolymerized polyamide resin (B), and subjected to evaluation of their physical properties. Results thus obtained are also shown in Table 2.

COMPARATIVE EXAMPLE 5

A polyamide resin was prepared in the same manner as in Example 7 except for not using the non-crystalline, partially aromatic, copolymerized polyamide resin (B), and subjected to evaluation of their physical properties. Results thus obtained are also shown in Table 2.

EXAMPLE 10

A polyamide resin composition was prepared in the same manner as in Example 1 except for using polyamide 6 (1013B made by Ube Industries, Ltd.) having a relative polyamide resin, and was subjected to evaluation of their physical properties. Results thus obtained are also shown in Table 2.

EXAMPLE 12

A polyamide resin composition was prepared in the same manner as in Example 1 except for using polyamide 6 (1030B made by Ube Industries, Ltd.) having a relative viscosity of 3.20 in place of polyamide 6 (1015B) as the polyamide resin, and was subjected to evaluation of their physical properties. Results thus obtained are also shown in Table 2.

TABLE 1

|  |  | Ex. 1 | Ex. 2 | Ex. 3 | Ex. 4 | Ex. 5 | Com. Ex. 1 | Com. Ex. 2 | Com. Ex. 3 |
|---|---|---|---|---|---|---|---|---|---|
| PA6 (1015B) | (wt %) | 97 | 99.9 | 99 | 98 | 96 | 100 | 99.95 | 92 |
| PA6I/6T | (wt %) | 3 | 0.1 | 1 | 2 | 4 |  | 0.05 | 8 |
| Tensile yield strength | MPa | 75 | 71 | 73 | 76 | 79 | 71 | 71 | 87 |
| Tensile break elongation | % | 190 | 181 | 192 | 178 | 177 | 190 | 191 | 170 |
| Bending strength | MPa | 108 | 106 | 105 | 108 | 110 | 100 | 100 | 115 |
| Bending modulus | GPa | 2.8 | 2.7 | 2.7 | 2.8 | 3.0 | 2.6 | 2.6 | 3.2 |
| Impact strength (notched Izod) | J/m | 66 | 63 | 65 | 65 | 66 | 65 | 64 | 60 |
| Flowability | mm | 116 | 113 | 115 | 115 | 111 | 112 | 113 | 85 |
| Temperature for molding weld strength test specimen | °C. | 250 | 250 | 250 | 250 | 250 | 250 | 250 | 250 |
| Injection weld strength | kgf | 232 | 197 | 210 | 224 | 229 | 180 | 185 | 287 |

TABLE 2

|  |  | Ex. 6 | Ex. 7 | Ex. 8 | Ex. 9 | Ex. 10 | Ex. 11 | Ex. 12 | Com. Ex. 4 | Com. Ex. 5 |
|---|---|---|---|---|---|---|---|---|---|---|
| PA66 (2020B) | (wt %) | 97 |  |  |  |  |  |  | 100 |  |
| PA66/6T (8123X) | (wt %) |  | 97 |  |  |  |  |  |  | 100 |
| PA6/66 (2123X) | (wt %) |  |  | 97 |  |  |  |  |  |  |
| PA12 (3020B) | (wt %) |  |  |  | 97 |  |  |  |  |  |
| PA6 (1013B) | (wt %) |  |  |  |  | 97 |  |  |  |  |
| PA6 (1022B) | (wt %) |  |  |  |  |  | 97 |  |  |  |
| PA6 (1030B) | (wt %) |  |  |  |  |  |  | 97 |  |  |
| PA6I/6T | (wt %) | 3 | 3 | 3 | 3 | 3 | 3 | 3 |  |  |
| Tensile yield strength | MPa | 79 | 85 | 68 | 45 | 76 | 74 | 71 | 72 | 93 |
| Tensile break elongation | % | 98 | 77 | 177 | 200 | 132 | 200 | 200 | 100 | 70 |
| Bending strength | MPa | 115 | 118 | 97 | 58 | 108 | 105 | 100 | 107 | 116 |
| Bending modulus | GPa | 3.1 | 3.3 | 2.5 | 1.8 | 2.8 | 2.8 | 2.7 | 2.7 | 3.2 |
| Impact strength (notched Izod) | J/m | 60 | 55 | 70 | 71 | 52 | 70 | 76 | 61 | 53 |
| Flowability | mm | 123 | 129 | 127 | 97 | 129 | 100 | 77 | 125 | 133 |
| Temperature for molding weld strength test specimen | °C. | 280 | 330 | 280 | 230 | 250 | 250 | 250 | 280 | 330 |
| Injection weld strength | kgf | 211 | 195 | 220 | 210 | 233 | 226 | 220 | 105 | 78 | viscosity of 2.45 in place of polyamide 6 (1015B) as the polyamide resin, and was subjected to evaluation of their physical properties. Results thus obtained are also shown in Table 2.

EXAMPLE 11

A polyamide resin composition was prepared in the same manner as in Example 1 except for using polyamide 6 (1022B made by Ube Industries, Ltd.) having a relative viscosity of 2.90 in place of polyamide 6 (1015B) as the

EXAMPLE 13

97% by weight of polyamide 6 (1015B made by Ube Industries, Ltd.; relative viscosity: 2.65) and 3% by weight of polyamide 6I/6T (Glibory G21 made by Emus Co.) were uniformly mixed in advance, with the total content of polyamide 6 and polyamide 6I/6T being 100% by weight, and kneaded in a biaxial, 44-mm φ vented extruder set at a barrel temperature of 270° C. Upon kneading the polyamide resins, glass fibers (made by Nihon Denki garasu K.K.; glass fiber diameter: 11 μm; glass fiber cut length: 3 mm) were fed in mid course of the extruder in an amount of 45 parts by weight per 100 parts by weight of the polyamide resin to prepare intended pellets of polyamide resin composition. Then, after drying the obtained pellets for 24 hours under a reduced pressure of 10 torr at 110° C., the pellets were subjected to injection molding at a cylinder temperature of 270° C. and a mold temperature of 80° C., followed by evaluating moldability and flowability according to ASTM using the tensile specimen, the bending test specimen and the impact test specimen. Further, tensile strength of a specimen molded by DRI method was measured. Results thus obtained are shown in Table 3.

EXAMPLES 14 TO 17

Polyamide resin compositions were prepared in the same manner as in Example 13 except for changing the charging ratio of polyamide 6 to polyamide 6I/6T as shown in Table 3, and were subjected to evaluation of their physical properties. Results thus obtained are also shown in Table 3.

EXAMPLES 18 TO 19

Polyamide resin compositions were prepared in the same manner as in Example 13 except for changing the content of glass fibers as shown in Table 3, and were subjected to evaluation of their physical properties. Results thus obtained are also shown in Table 3.

EXAMPLE 20

A polyamide resin composition was prepared in the same manner as in Example 13 except for feeding 45 parts by weight of talc (Talc Cup made by Tuchiya Kaolin kogyo K.K.) in place of glass fibers, and was subjected to evaluation of their physical properties. Results thus obtained are also shown in Table 3.

COMPARATIVE EXAMPLE 6

A polyamide resin composition was prepared in the same manner as in Example 13 except for not using the non-crystalline, partially aromatic, copolymerized polyamide resin (B), and was subjected to evaluation of their physical properties. Results thus obtained are also shown in Table 3.

COMPARATIVE EXAMPLES 7 AND 8

Polyamide resin compositions were prepared in the same manner as in Example 13 except for changing the charging ratio of polyamide 6 to polyamide 6I/6T as shown in Table 3, were and subjected to evaluation of their physical properties. Results thus obtained are also shown in Table 3.

EXAMPLE 21

A polyamide resin composition was prepared in the same manner as in Example 13 except for using polyamide 66 (2020B made by Ube Industries, Ltd.; relative viscosity: 2.70) in place of polyamide 6 as the polyamide resin, and was subjected to evaluation of their physical properties. Kneading was conducted at a barrel temperature of 285° C., and injection molding was conducted at a cylinder temperature of 275° C. and a mold temperature of 80° C. Results thus obtained are shown in Table 4.

EXAMPLE 22

A polyamide resin composition was prepared in the same manner as in Example 13 except for using polyamide 66/6T (8123X made by Ube Industries, Ltd.; relative viscosity: 2.30) in place of polyamide 6 as the polyamide resin, and subjected to evaluation of their physical properties. Kneading was conducted at a barrel temperature of 320° C., and injection molding was conducted at a cylinder temperature of 320° C. and a mold temperature of 110° C. Results thus obtained are also shown in Table 4.

EXAMPLE 23

A polyamide resin composition was prepared in the same manner as in Example 13 except for using polyamide 6/66 (2123B made by Ube Industries, Ltd.; relative viscosity: 2.65) in place of polyamide 6 as the polyamide resin, and subjected to evaluation of their physical properties. Kneading was conducted at a barrel temperature of 280° C., and injection molding was conducted at a cylinder temperature of 270° C. and a mold temperature of 80° C. Results thus obtained are also shown in Table 4.

EXAMPLE 24

A polyamide resin composition was prepared in the same manner as in Example 13 except for using polyamide 12 (3020B made by Ube Industries, Ltd.; relative viscosity: 2.90) in place of polyamide 6 as the polyamide resin, and was subjected to evaluation of their physical properties. Kneading was conducted at a barrel temperature of 240° C., and injection molding was conducted at a cylinder temperature of 240° C. and a mold temperature of 80° C. Results thus obtained are also shown in Table 4.

EXAMPLE 25

A polyamide resin composition was prepared in the same manner as in Example 13 except for using polyamide 6 (1013B made by Ube Industries, Ltd.) having a relative viscosity of 2.45 in place of polyamide 6 (1015B) as the polyamide resin, and was subjected to evaluation of their physical properties. Results thus obtained are also shown in Table 4.

EXAMPLE 26

A polyamide resin composition was prepared in the same manner as in Example 13 except for using polyamide 6 (1022B made by Ube Industries, Ltd.) having a relative viscosity of 2.90 in place of polyamide 6 (1015B) as the polyamide resin, and was subjected to evaluation of their physical properties. Results thus obtained are also shown in Table 4.

EXAMPLE 27

A polyamide resin composition was prepared in the same manner as in Example 13 except for using polyamide 6 (1030B made by Ube Industries, Ltd.) having a relative viscosity of 3.20 in place of polamide 6 (1015B) as the polyamide resin, and was subjected to evaluation of their physical properties. Results thus obtained are also shown in Table 4.

COMPARATIVE EXAMPLE 9

A polyamide resin composition was prepared in the same manner as in Example 21 except for not using the non-crystalline, partially aromatic, copolymerized polyamide resin (B), and was subjected to evaluation of their physical properties. Results thus obtained are also shown in Table 4.

COMPARATIVE EXAMPLE 10

A polyamide resin composition was prepared in the same manner as in Example 22 except for not using the non-crystalline, partially aromatic, copolymerized polyamide resin (B), and was subjected to evaluation of their physical properties. Results thus obtained are also shown in Table 4.

TABLE 3

|  |  | Ex. 13 | Ex. 14 | Ex. 15 | Ex. 16 | Ex. 17 | Ex. 18 | Ex. 19 | Ex. 20 | Com. Ex. 6 | Com. Ex. 7 | Com. Ex. 8 |
|---|---|---|---|---|---|---|---|---|---|---|---|---|
| PA6 (1015B) | (wt %) | 97 | 99.9 | 99 | 98 | 96 | 97 | 97 | 97 | 100 | 99.95 | 92 |
| PA6I/6T | (wt %) | 3 | 0.1 | 1 | 2 | 4 | 3 | 3 | 3 |  | 0.05 | 8 |
| Glass fibers (parts by weight) |  | 45 | 45 | 45 | 45 | 45 | 5 | 100 |  | 45 | 45 | 45 |
| Talc (parts by weight) |  |  |  |  |  |  |  |  | 45 |  |  |  |
| Tensile strength | MPa | 182 | 180 | 179 | 180 | 184 | 85 | 220 | 95 | 183 | 180 | 183 |
| Tensile elongation | % | 5 | 5 | 5 | 5 | 5 | 3 | 3 | 5 | 5 | 5 | 5 |
| Bending strength | MPa | 255 | 253 | 255 | 258 | 260 | 141 | 300 | 135 | 256 | 255 | 260 |
| Bending modulus | GPa | 8.2 | 8.2 | 8.0 | 8.2 | 8.3 | 3.2 | 13.1 | 5.1 | 8.2 | 8.2 | 8.3 |
| Impact strength (notched Izod) | J/m | 151 | 149 | 152 | 150 | 155 | 55 | 166 | 40 | 149 | 150 | 154 |
| Flowability | mm | 67 | 68 | 67 | 68 | 65 | 90 | 52 | 69 | 65 | 66 | 57 |
| Temperature for molding weld strength test specimen | ° C. | 300 | 300 | 300 | 300 | 300 | 300 | 300 | 300 | 300 | 300 | 300 |
| Injection weld strength | kgf | 394 | 342 | 361 | 377 | 399 | 260 | 372 | 310 | 240 | 277 | 396 |

TABLE 4

|  |  | Ex. 21 | Ex. 22 | Ex. 23 | Ex. 24 | Ex. 25 | Ex. 26 | Ex. 27 | Com. Ex. 9 | Com. Ex. 10 |
|---|---|---|---|---|---|---|---|---|---|---|
| PA66 (2020B) | (wt %) | 97 |  |  |  |  |  |  | 100 |  |
| PA66/6T (8123X) | (wt %) |  | 97 |  |  |  |  |  |  | 100 |
| PA6/66 (2123B) | (wt %) |  |  | 97 |  |  |  |  |  |  |
| PA12 (3020B) | (wt %) |  |  |  | 97 |  |  |  |  |  |
| PA6 (1013B) | (wt %) |  |  |  |  | 97 |  |  |  |  |
| PA6 (1022B) | (wt %) |  |  |  |  |  | 97 |  |  |  |
| PA6 (1030B) | (wt %) |  |  |  |  |  |  | 97 |  |  |
| PA6I/6T | (wt %) | 3 | 3 | 3 | 3 | 3 | 3 | 3 |  |  |
| Glass fibers (parts by weight) |  | 45 | 45 | 45 | 45 | 45 | 45 | 45 | 45 | 45 |
| Tensile strength | MPa | 190 | 191 | 172 | 142 | 179 | 180 | 177 | 180 | 190 |
| Tensile elongation | % | 4 | 3 | 5 | 8 | 4 | 5 | 6 | 5 | 3 |
| Bending strength | MPa | 260 | 272 | 244 | 195 | 249 | 253 | 247 | 258 | 270 |
| Bending modulus | GPa | 8.6 | 9.3 | 7.7 | 7.1 | 8.0 | 8.0 | 8.1 | 8.2 | 9.1 |
| Impact strength (notched Izod) | J/m | 132 | 121 | 158 | 218 | 147 | 167 | 175 | 150 | 123 |
| Flowability | mm | 72 | 77 | 76 | 61 | 75 | 54 | 40 | 73 | 77 |
| Temperature for molding weld strength test specimen | ° C. | 300 | 330 | 300 | 240 | 300 | 300 | 300 | 300 | 330 |
| Injection weld strength | kgf | 341 | 317 | 362 | 392 | 394 | 342 | 327 | 186 | 124 |

It is seen, from these results, that the effect of improving weld strength is not obtained when the content of resin (B) becomes too small while, when the content of the resin (B) becomes too large, flowability within the mold is decreased to deteriorate moldability. The effects of the resin (B) are obtained with various crystalline polyamide resins.

The polyamide resin composition of the present invention shows a high weld strength without spoiling mechanical properties essential to crystalline polyamide resins. Thus, it can be used for producing large-sized moldings or complicately shaped parts without requiring special molding machines or special post-working techniques.

While the invention has been described in detail and with reference to specific embodiments thereof, it will be apparent to one skilled in the art that various changes and modifications can be made therein without departing from the spirit and scope thereof.

What is claimed is:

1. A polyamide resin molding composition showing excellent weld strength, which comprises:
   (A) 96 to 99.9% by weight of a crystalline, non-aromatic polyamide resin; and
   (B) 0.1 to 4% by weight of a non-crystalline, partially aromatic, copolymerized polyamide resin containing at least 2 different aromatic monomer components;

wherein the crystalline, non-aromatic polyamide resin is an aliphatic polyamide resin comprising an aliphatic diamine and an aliphatic dicarboxylic acid or a lactam or an aminocarboxylic acid; and wherein the total content of the crystalline, non-aromatic polyamide resin and the non-crystalline, partially aromatic, copolymerized polyamide resin is 100% by weight.

2. The polyamide resin molding composition showing excellent weld strength as claimed in claim 1, which further comprises 5 to 200 parts by weight of (C) an inorganic filler per 100 parts by weight of the polyamide resin molding composition.

3. The polyamide resin molding composition showing excellent weld strength as claimed in claim 2, wherein the inorganic filler (C) is glass fibers.

4. The polyamide resin molding composition showing excellent weld strength as claimed in claim 1, wherein the non-crystalline, partially aromatic, copolymerized polyamide resin containing at least 2 different aromatic monomer components comprises 60 to 95 mol % of a terephthalic acid component unit and 5 to 40 mol % of an isophthalic acid component unit and an aliphatic diamine, with the total content of the terephthalic acid component unit and the isophthalic acid component being 100 mol %.

5. The polyamide resin molding composition showing excellent weld strength as claimed in claim 1, wherein the non-crystalline, partially aromatic, copolymerized polyamide resin containing at least 2 different aromatic monomer components comprises 100 to 60% by weight of a polyamide-forming component comprising an aliphatic diamine, isophthalic acid and terephthalic acid and 0 to 40% by weight of an aliphatic polyamide component, with the total content of the polyamide-forming component and the aliphatic polyamide component being 100% by weight.

* * * * *